United States Patent [19]

Hollies et al.

[11] 3,709,657

[45] Jan. 9, 1973

[54] WET FIXATION OF RESINS IN FIBER SYSTEMS FOR DURABLE PRESS PRODUCTS

[75] Inventors: Norman R. S. Hollies, Bethesda; Steven R. Chafitz, Rockville, both of Md.

[73] Assignee: Cotton, Incorporated, New York, N.Y.

[22] Filed: Jan. 19, 1971

[21] Appl. No.: 107,719

Related U.S. Application Data

[63] Continuation-in-part of Ser. No. 764,950, Oct. 3, 1968, abandoned.

[52] U.S. Cl. ............8/116.3, 8/116.2, 8/116.4, 8/120, 8/115.7, 8/127.6, 8/128, 8/149.3, 8/DIG. 2, 8/DIG. 4, 8/DIG. 8, 8/DIG. 21, 38/144, 117/139.4, 117/143 A, 117/161 LN, 2/243

[51] Int. Cl. ............D06m 15/58, D06m 15/52

[58] Field of Search ...2/243; 38/144; 8/116.3, 116.4, 8/116.2, 120; 117/139.4

[56] References Cited

UNITED STATES PATENTS

| | | | |
|---|---|---|---|
| 3,472,606 | 10/1969 | Getchell et al. | 8/116.3 |
| 3,311,496 | 3/1967 | Van Loo | 8/116.3 |

Primary Examiner—George F. Lesmes
Assistant Examiner—J. Cannon
Attorney—Burns, Doane, Swecker & Mathis

[57] ABSTRACT

Creaseproofing resins are rapidly and continuously wet fixed on a fiber system such as a cotton fabric, for use in the production of durable press articles.

In this process, a bath containing a mixture of polymer forming and crosslinking agents and an acid catalyst is applied to the cellulosic fiber system; the wet swollen fibers are heated and held under highly humid or substantially non-evaporative, hot conditions, e.g., in steam between about 100° and about 140°C., for only from about 10 to about 90 seconds so that at least about 3 percent of polymer forming resin becomes wet fixed thereon; and the system is then promptly cooled to quench the polymerization reaction as well as minimize resin hydrolysis. Preferably, the steamed fabric is neutralized, washed and dried under mild conditions. If the catalyst is thus removed, a latent curing catalyst is applied to such a fabric before it is made into garments or other articles and dry cured to impart durable press properties thereto. Instead of applying a latent catalyst to the fabric prior to garment fabrication, it is possible to apply an appropriate curing catalyst at a later stage, as by introducing it directly into the vapor space of the curing chamber.

18 Claims, 1 Drawing Figure

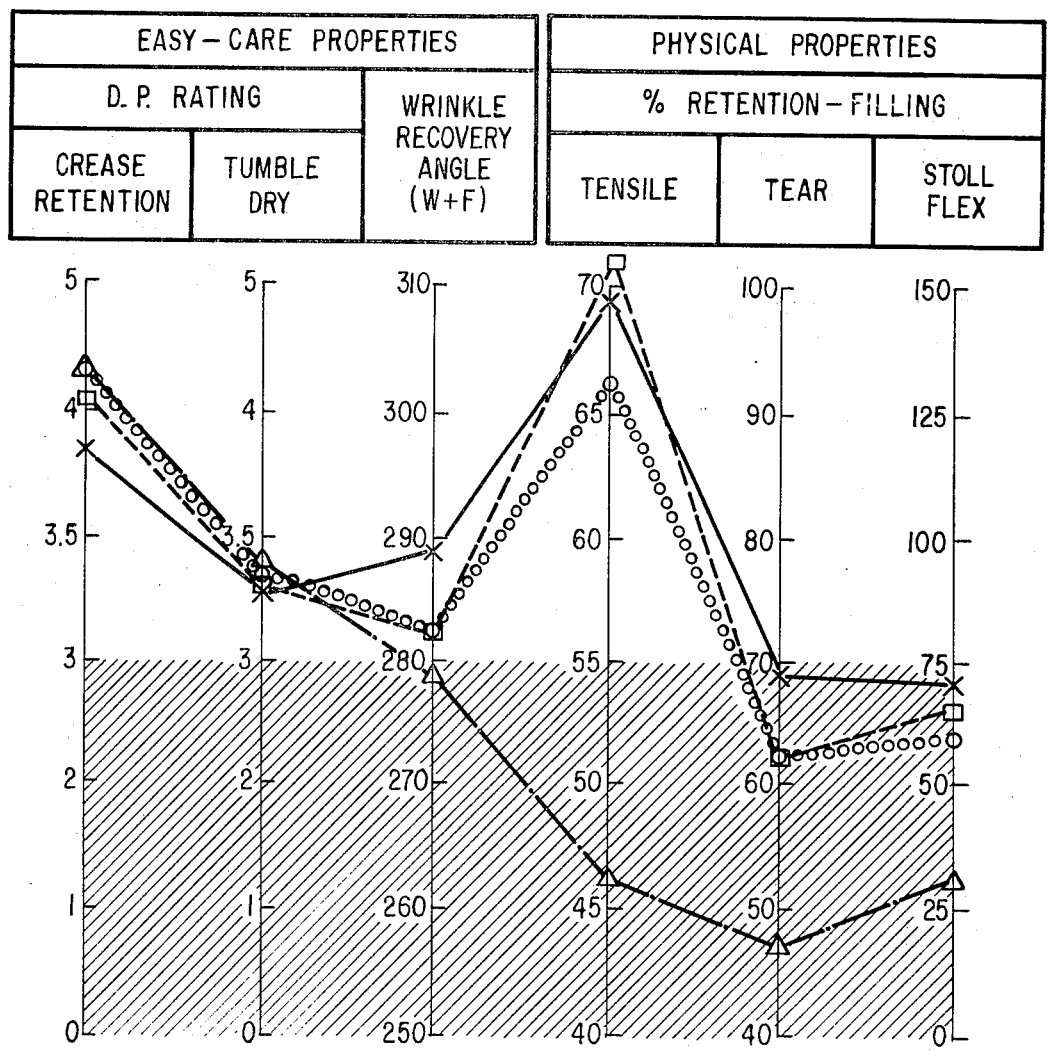

WET FIXATION OF RESINS IN FIBER SYSTEMS FOR DURABLE PRESS PRODUCTS

CROSS-REFERENCE TO PRIOR APPLICATION

This application is a continuation-in-part of prior application Ser. No. 764,950, filed Oct. 3, 1968 and now abandoned.

BACKGROUND OF INVENTION

Since the inception of the first durable press process for cotton, textile chemists have sought to crosslink cellulosic fibers under conditions designed to give high levels of shape retention, flat or creased, without attendant severe losses in strength properties. The wet-fixation process disclosed by Getchell in U.S. Pat. No. 3,138,802 has been a major step in this direction. The wet-fixation process employing a combination of resins as disclosed by Getchell and Hollies in U.S. Pat. No. 3,472,626 represents a more recent improvement in such wet-fixation technique. Interest in commercial application of such wet-fixation processes has been high because of the very substantial improvement in properties of the fabrics processed this way. However, commercial development of wet-fixation processes has been impeded by the fact that, to give optimum results, the wet-fixation of resin had to be carried out at relatively slow production speeds, in batch or semi-batch operations, and at low resin utilization efficiencies.

SUMMARY OF INVENTION

It is an object of this invention to provide a wet-fixation process permitting continuous, high speed processing as well as efficient resin utilization. A more particular object of this invention is to provide a process wherein the required extent of resin wet-fixation is accomplished in not more than about 90 seconds, and preferably in less than 1 minute. Another object is to provide a process wherein the efficiency of resin fixation on or in the fibers is well above the 25 percent level which is characteristic for the wet-fixation techniques previously disclosed in the art. A still more specific object is to provide a wet-fixation process wherein the efficiency of resin fixation is at least 40 percent, and preferably in the range from between about 55 to 90 percent, such that relatively dilute resin solutions may be used if desired.

The present invention is based on the discovery that the effectiveness of previously proposed wet-fixation processes, and particularly of that disclosed in previously mentioned U.S. Pat. No. 3,472,606 can be made surprisingly more effective by swelling the cellulosic fibers in a hot, moist condition, e.g., in a hot steam atmosphere, following padding in the acidified resin solution, and sharply limiting the duration of such a hot wet-fixation step. More particularly, it has been discovered that the steaming or heating in a high moisture environment serves to speed up the penetration of the fibers by the picked up resin solution. At the same time, undesirable phenomena such as excessive resin hydrolysis or resin migration from the interior portions of the fiber back to the fiber surface are kept at a minimum by keeping the duration of such a hot wet-fixation process very brief. Such hydrolysis and migration have been found to take place when the impregnated fiber is maintained in steam for longer periods and have distinctly undesirable effects.

Partial drying of the fibers after padding and before steaming or high moisture heating has been found to give a further improvement in resin efficiency and effectiveness of the process. More particularly, it has been found that to achieve the optimum in fabric performance with a minimum amount of resin it is necessary not only to have sufficient polymer forming resin as well as crosslinking agent in the fiber system but also to have the resins evenly distributed within the individual fibers. Steaming or wet condition heating, when properly conducted, has been found to result in the attainment of a more even distribution of resin within the fibers as well as a reduction of the total resin required for optimum performance. The time required for wet-fixation can be reduced by a factor of 20 to 30 when proceeding according to this invention as compared to wet-fixation by previously disclosed procedures. As there is a concomitant increase in efficiency of resin utilization, wet heating or steaming in accordance with the present invention makes it possible to reduce resin solids in the padding bath to one-half or one-third.

As in the process described in the aforesaid U.S. Pat. No. 3,472,606, a preferred embodiment of the present invention involves the use of a combination of resins or components. One of these is a relatively slow acting polymer former such as a methylol precondensate which is relatively easy to affix to the textile material, e.g., a melamine-formaldehyde precondensate or a phenolformaldehyde precondensate. The other component is one that is highly reactive as a cellulose crosslinker but difficult to apply at high add-ons, e.g., a glyoxal-formaldehyde-urea precondensate such as a dihydroxydimethylolethyleneurea, a cyclic ethylene ureaformaldehyde precondensate, the corresponding propylene ureas, formaldehyde itself, etc.

In some cases, especially when infrared heat is used in the wet-fixation step, the polymer former by itself, such as a melamine-formaldehyde precondensate, is found to give adequate wrinkle recovery even in the absence of a separately added active crosslinker, as sufficient formaldehyde can be released by hydrolysis in such a case to serve as the active crosslinker.

BRIEF DESCRIPTION OF DRAWING

The FIGURE is a performance profile chart which graphically compares easy-care and physical properties of cotton twill fabrics wet fixed by steam, infrared and envelope methods with those properties of twill fabric treated by a conventional pad-dry-cure method.

DESCRIPTION OF PREFERRED EMBODIMENTS

POLYMER FORMERS

The essential characteristic of the first agent or polymer former is that it can be applied to the textile material from aqueous solutions and wet fixed in the swollen material at relatively high add-ons. Such agents, even when fully cured, do not normally by themselves improve the wrinkle recovery of the material to meet high commercial standards. However, their presence has been found essential for assuring proper crosslinker penetration into the fibers and synergistically producing the desired performance profile.

The polymer formers useful herein include particularly the easily hardenable precondensates which are substantially water soluble and are obtained by condensation of formaldehyde with a compound such as a lower alkyl substituted melamine, a urea, or a phenol such as resorcinol. As is well known in the resin treating art, these precondensates are capable of being applied to the cellulosic material from an aqueous solution and to be readily fixed and insolubilized therein as described, for instance, by Getchell in U.S. Pat. No. 3,138,802. Triazines obtained by condensing a lower alkyl substituted melamine and formaldehyde are examples of such precondensates. Good results are obtained, for instance, using precondensates obtained by condensing 1 mole of melamine or an alkyl substituted melamine with 2 to 6 moles of formaldehyde, i.e., using di-, tri- or hexamethylol melamine. Commercially available products of this kind include Aerotex 23, an alkylated melamine-formaldehyde precondensate; Aerotex M-3, a dimethoxymethylhydroxymethylmelamine; Aerotex P-225, hexakis(methoxymethyl) melamine; and Aerotex 19, which is a less completely fractionated modification of Aerotex P-225. These products are supplied in the form of aqueous solutions by American Cyanamid Company.

CROSSLINKERS

The essential characteristic of the second resin which is normally used in the practice of the present invention is that it is one of the more highly reactive cellulose crosslinking agents. Such agents are well known for imparting excellent wrinkle recovery to cellulosic materials upon curing at high temperature but are very difficult to wet fix in the material at high add-ons. When wet-fixed by themselves, they consequently tend to result either in inadequate wrinkle recovery or in excessive strength loss or both.

Suitable crosslinking agents include the highly reactive condensates of formaldehyde and a 5-membered cyclic ethylene urea of the kind shown in U.S. Pat. No. 3,177,093. Especially useful are products such as dihydroxydimethylolethyleneurea, "DHDMEU," available as Permafresh 183 or in a somewhat modified, less reactive form as Permafresh 113B from Sun Chemical Company, as well as modified propylene urea compounds such as Fixapret PCL, available from Badische Anilin und Soda-Fabrik. Condensates having at least 1½ moles of formaldehyde combined as methylol formaldehyde with a cyclic urea are suitable and the dimethylol derivatives are preferred. However, it is similarly feasible to use other known crosslinking agents such as the rapidly acting triazones, N-methylol carbamates, and aldehydes themselves such as formaldehyde, glutaraldehyde, glyoxal, as well as tris(1-aziridinyl)phosphine oxide, divinyl sulfone, epoxy resins, etc. In fact any compound which will act to form crosslinks between adjacent cellulose molecules or between the cellulose and the polymer deposited within the fiber structure may be used here.

GENERAL PROCEDURE

To be applied to the fiber system, the polymer former is used in the form of an aqueous solution which may contain from about 5 to about 25 percent, preferably 7 to 10 percent, of the resinous precondensate. To assure rapid wet-fixation of such a precondensate in the fabric in the desired amount it is necessary to adjust the pH of the padding solution to a value between 1 and about 4, preferably about 2 to 3, by addition of a strong acid. Hydrochloric acid is preferred but other strong acids such as sulfuric acid, formic acid, acetic anhydride or maleic anhydride, or mixtures of the foregoing may be used similarly.

The active crosslinking agent is preferably included in the same padding bath as the polymer former to provide a concentration of crosslinker in the bath of between about 2 to 25 percent. Best results are usually obtained when polymer former and crosslinker are present in equal or near equal concentrations, though different proportions are permissible.

Instead of including the crosslinker in the same bath as the polymer former prior to wet-fixation, it is also possible to apply the crosslinker after the polymer former has been wet fixed in the material, e.g., simultaneously with a latent catalyst such as zinc nitrate or zinc chloride which is used to catalyze the final dry cure.

In addition to the aforementioned resins, the initial padding bath or the latent catalyst bath applied subsequent to wet-fixation, or both these baths, may include other agents conventionally used in the art. For instance, softeners such as polyethylene in finely dispersed form, flame retardants, soil release agents, hand modifiers, water and stain repellents, and so forth, may be included as is otherwise well known.

Application of the resin solution to the cellulosic material can be done by conventional padding using customary equipment, or by spraying and other processes well known in the art. Baths containing from between about 5 to about 10 percent each of polymer former and crosslinker are particularly advantageous in the practice of the present invention. Typically, they are applied to the fabric at a wet pick-up of between about 50 to 80 percent, so as to give upon wet-fixation a total resin on of between about 5 and 15 percent, preferably between 7 and 12 percent, based on dry fabric weight. The padding may be conducted at ambient temperature, e.g., between 10° and 30°C.

After padding, the material containing the aqueous resin solution is passed continuously to and through a heating zone where the resins are wet fixed, i.e., polymerized and rendered substantially insoluble under conditions which insure the retention of a goodly amount of moisture in the fibers during this heating step. More particularly, when such rapid heating is conducted in a heating chamber containing added live steam or when the moisture occluded in the fibers is rapidly heated by other means while limiting evaporative moisture loss from the cellulose fibers, the latter become rapidly swollen. This swollen condition then facilitates quick and uniform resin penetration and resin polymerization or "wet-fixation" in the water swollen fibers while minimizing undesirable effects such as resin migration, hydrolytic resin decomposition and cellulose crosslinking.

As an optional feature, resin utilization may be increased by limited drying of the freshly padded fabric, as by passing it between infrared lamps before it is introduced into a steamer or other heater where the wet-fixation is to be performed. The water content of the impregnated fabric may thus be reduced to between about 25 and 40 percent based on dry fabric weight. However, it should not be dried to a water content lower than 20 percent, as this is approximately the minimum required to be maintained in the fibers during the wet-fixation step for satisfactory results.

The steamer or high humidity heater where the wet-fixation is actually performed is maintained at a temperature of between about 100° and 250°C., preferably between about 100° and 140°C., the fabric being maintained in this environment for a total dwell time of less than 2 minutes, e.g., for from 10 seconds or less to 30 or 60 seconds. As a result the moist fabric is rapidly heated to a temperature approaching the boiling point of the impregnated solution, e.g., to a temperature between about 95° and 100°C., while its moisture content is not permitted to fall below about 20 percent.

The use of saturated steam is a convenient means for assuring that the cellulosic fibers reach a highly swollen state rapidly while being heated to the desired temperature with only negligible moisture evaporation. However, the use of superheated steam or even of essentially dry heat sources is permissible as long as the moisture content of the atmosphere in the heating zone is maintained at a sufficient level such that the cellulosic fibers remain sufficiently swollen throughout to keep them from becoming superficially dried out or effectively creaseproofed while they are being heated and the resin is being wet fixed therein.

For instance, when using a dry heat source, the wet padded material may be passed through or placed in a suitably shaped heating chamber and allowed to remain there for the proper short time. Such chamber may be heated to a temperature between about 100° and 250°C., e.g., between 150° and 220°C., by means of infrared lamps. As an alternative, internal heating of the moist fabric can be achieved by use of a high frequency electric field which generates dielectric heating as the result of internal electric energy losses during the rapid reversal of polarization of molecules in the dielectric material, or the padded material may be heated by being passed at a high speed over a set of steam heated, rotating dry cans having a surface temperature of from about 100° to 160°C. or higher. In each of these cases, the desired rapid rate of heating can be readily achieved in a manner which is otherwise well known per se, but the heating unit is designed so as to keep the loss of moisture as low as practical.

In other words, the critical feature of the present invention is not the specific heat source used to heat the material during the wet-fixation step. What is critical is the rapid and brief heating of the moist material to an effective wet-fixation temperature by passage through a heating zone which is maintained at a temperature of at least about 100°C. while preventing the moisture content of the material from decreasing substantially below 20 percent during this step. When wet-fixation of the resin is thus achieved the still moist material is immediately quenched to prevent effective creaseproofing of the fibers from taking place at this stage and to keep unwanted chemical and physical changes at a minimum.

As described earlier herein, this can be conveniently achieved by effecting the wet-fixation in a steamer into which steam is injected serving at once as a source of heat and as a swelling aid and evaporation repressant. However, similar results can also be achieved in a heating zone which is heated by infrared lamps or by other conventional dry heating means, but in such a case high relative humidity is obtained by reducing air circulation in such a treating zone or chamber so as to permit the build-up of moisture therein and so preclude the moisture content of the hot fabric being treated from falling below the indicated minimum. The resulting steam-containing or high humidity atmosphere serves to prevent or slow down the evaporation of water from the padded fabric while it swells in the heater and while rapid wet-fixation or insolubilization of resin takes place in the hot swollen fibers.

To achieve this result when a dry heat source is used, it is best to use a heating zone which has been designed or modified to have as little air space and air circulation as practical. For instance, when an infrared heating system or a stack of dry cans is set up in an open working area in a plant, the heating system itself through which the fabric passes should be enclosed in a tall, narrow plywood or metal box or chamber, or be closely curtained off with fabric curtains. Such enclosures serve to concentrate the heat on the fabric where it is needed while minimizing evaporation of moisture from the fabric being treated. With fabric entering and leaving the bottom of such a box or enclosure and the heaters such as infrared lamps being placed to face the fabric just inside the entrance, a moist atmosphere can be easily maintained such that evaporation of liquid from the fabric in the heating step is kept low and the moisture content of the fabric is kept above the essential minimum even at the fabric surface.

It is possible to practice the invention by heating the fabric while it is maintained under widthwise tension. This can be done, for instance, in a properly equipped tenter frame which includes infrared heaters situated above and below the fabric as it passes through the frame. Air circulation in such a heated section of the tenter frame is kept low by suitable design in order to maintain high relative humidity and avoid excessive drying until the heat treated fabric is quenched. In addition to maintaining width tension, this arrangement has the advantage that the wet fabric is not in contact with rolls or cans across its width during the wet-fixation step and thus avoids mark-off of resin and build-up of chemicals such as melamine on roll surfaces.

When reference is made herein to avoidance of effective creaseproofing in any particular step or treatment, this means that such step or treatment is conducted under conditions which do not alter the dry crease recovery angle of the fiber system to such an extent as to impede the creasing or other distinct shaping of such a fiber system during subsequent apparent manufacture or the like.

An essential aspect of the present invention is that when wet-fixation is conducted in a steam atmosphere, i.e., in a hot, high humidity atmosphere, as just described, the cellulosic fibers swell quickly and creaseproofing agents or resinous precondensates applied thereto penetrate into and polymerize in the fibers more rapidly than has heretofore been believed possible. In fact, if the steaming time of the fibers in their acid condition is extended substantially above 1½ minutes, the applied agents which become evenly distributed through the fibers may begin to hydrolyze as well as migrate back to the fiber surface. There, under the prevailing acid conditions, they continue to polymerize, impairing the effectiveness of the internal resin for achieving wrinkle resistance and strength protection.

Consequently, in accordance with the present invention it is essential not only to keep the steaming time short, e.g., 1½ minutes or preferably considerably less, but also to quench the polymerization reaction and dissipate acidity from the treated fabric promptly upon conclusion of the hot wet-fixation step and thereby minimize the occurrence of the unwanted side reactions or physical changes in the wet-fixed system. In the absence of quenching, or with prolonged steaming times prior to quenching, the applied resins or their components migrate back to the fiber surface and there impair the mechanical properties of the fabric. Moreover, to the extent that resin migrates back to the surface, the polymer former is no longer available internally to protect or prop open the fiber structure after wet-fixation, and the crosslinker is no longer available to crosslink the fiber structure evenly. More total resin add-on is required under such conditions to produce satisfactory durable press properties.

Suitable quenching can be achieved by passing the moist acid fabric bearing the wet fixed resin immediately after its heat treatment through a bath of an appropriate alkali, as by padding the fabric issuing from the steamer in a 2 percent aqueous solution of sodium carbonate. Of course, dilute aqueous solutions of other alkalis such as sodium bicarbonate, sodium hydroxide, potassium hydroxide or potassium carbonate or bicarbonate may be used similarly. Often it may be most convenient to quench the hot fabric first in a cooling fluid such as cold water before neutralization with an alkali. In either case, when proceeding in this manner, it has been found possible to obtain good end product properties with a polymer former add-on of under 8 percent, e.g., 3 to 7 percent, although a polymer former add-on in the range of from 5 to 10 percent may be preferred.

After neutralization, the fabric containing the resins wet fixed thereto is preferably washed in water to remove water soluble substances and loosely held surface polymer, and dried and then padded in a bath containing a latent acid salt catalyst, as is otherwise well known in the art. While zinc nitrate, $Zn(NO_3)_2 \cdot 6H_2O$, was the most common catalyst used in the work described herein, other known curing catalysts such as zinc chloride, magnesium chloride, ammonium chloride are similarly useful.

The catalyst is applied to the fabric to provide about 1 to 10 percent, e.g., about 5 percent, catalyst based on the weight of the wet fixed precondensate. As previously suggested, a softener such as finely dispersed polyethylene may be included in the catalyst bath as is otherwise well known in the art. After catalyst impregnation and drying under mild conditions, i.e., under a combination of temperature, time and ultimate moisture regain which does not cause the treated polymer bearing material to become prematurely cured or effectively creaseproofed, the fabric is ready for apparel manufacture, e.g., for cutting, sewing, pressing and final dry curing to provide durable press characteristics. The final cure may be effected in a walk-in air oven at temperatures between about 120° and 180°C., e.g., between 145° and 165°C. For instance, a residence or dwell time of about 5 minutes in an air oven at 160°C. gives satisfactory cure in a typical case though curing times in the range from between about 2 to 10 minutes are commonly used. Curing may, for instance, also be accomplished in equipment such as a garment press which has been provided with adequate heating and dwell time control means. Optimum cure times of course depend somewhat on the specific kinds and amounts of resin used, the type of fabric and the temperature and heat transfer characteristics of the curing equipment.

Instead of applying a latent catalyst to the fabric prior to product fabrication, an appropriate curing catalyst may be applied at a later stage, as by introducing it directly as a vapor into the curing chamber.

FABRIC OR FIBER SYSTEMS

The invention is applicable to a wide variety of fibrous materials or systems which contain cellulosic fibers such as cotton or regenerated cellulose. The process may be applied to fibers, filaments, yarns and threads but is particularly useful when applied to woven and non-woven fabrics or webs. It is especially useful in the manufacture of durable press garments, but offers important advantages in the manufacture of other types of cellulosic articles as well, whenever good shape retention, abrasion resistance and strength are desired, e.g., in the manufacture of tufted cotton carpets, molded cotton batting and so forth. The invention is applicable to natural cellulose material such as cotton and linen as well as regenerated cellulose such as viscose and high wet modulus (polynosic) rayon. The invention is also applicable to fabric blends, e.g., blends which contain 15 percent or more of cotton or other cellulosic fiber mixed with polyester, nylon or wool fibers.

In the illustrative examples described below, two twill fabrics were used as indicated. One fabric, hereafter designated as No. 413, was a twill of 6.8 oz./sq.yd. weight and 112 × 54 thread count. The other fabric, hereafter designated as "NCC," was a twill of 7.6 oz./sq.yd. weight and 116 × 52 thread count. Under comparable conditions, the second twill was found to perform somewhat better because it retained fewer wrinkles from earlier wet processing such as preliminary scouring, mercerizing, bleaching or dyeing.

EVALUATION PROCEDURES

In evaluating the effectiveness of the invention, the physical properties of the various treated fabrics were measured at 65 percent relative humidity and 21°C. Wrinkle recoveries were measured with a Monsanto tester. Smoothness appearance was determined under overhead lighting by visual comparison with a series of three-dimensional graded fabric replicas. The sharpness of the creases after laundering, i.e., crease retentions were obtained in standard side lighting using the Eastman photographic standard. Grab breaking strengths were measured on 4-inch × 6-inch samples with 3 inches between the jaws of an Instron test machine. Tearing strengths were measured on an Elmendorf machine with 2½ × 3-inch swatches. Stoll flex abrasion was carried out with a 1-pound head and 4 pounds tension. Evaluations in most cases were carried out on samples given a single laundering and tumble drying cycle.

Generally, add-on of resin was determined after wet-fixation, neutralization, washing and drying, by weighing the conditioned samples and determining their weight increase. 5- to 10-yard lengths of treated cloth were weighed to give accurate add-on figures. In some instances add-on was additionally determined by quantitative analysis for nitrogen.

Resin distribution in the fibers was assessed by dyeing yarns from the treated samples, embedding them in a plastic matrix, sectioning and observation in a light microscope. Acid Red Color Index No. 85 was used to detect location of the resin.

Each of the five properties chosen for evaluation is given in the examples on scales suitable for all-cotton durable press fabrics, the mechanical properties of a treated fabric being compared with those of an untreated prepared fabric. The following scales were used in describing the performance profile of the fabrics:

0 – 5   Crease retention rating (AATCC Test Method 88C — 1964)
0 – 5   Durable press rating (AATCC Test Method 124 — 1967)
250 – 310   Wrinkle recovery (average W + F for twill)
40 – 70   Filling breaking strength retention (%)
40 – 100   Filling tearing strength retention (%)
0 – 300   Filling Stoll flex abrasion retention (%)

With reference to the specific examples which follow it should be understood that these are not intended to be limiting and that many variations and modifications of this invention not specifically described herein can be made by persons skilled in the art without departing from the scope and spirit of this invention. Unless otherwise indicated, all percentages and ratios of materials are expressed on a weight basis throughout this specification and appended claims.

EXAMPLE 1

In this example twill fabric No. 413 was treated for comparison in four different ways.

In Test 1, the fabric was treated by the conventional pad-dry-cure technique. More particularly, the fabric was padded in a resin bath containing 8.1 percent dihydroxydimethylolethyleneurea, DHDMEU, ("Permafresh 183"), 1.3 percent conventional polyethylene softener and 1% $Zn(NO_3)_2 \cdot 6H_2O$. Wet pick-up of resin solution in this test was 75 percent, which was also the wet pick-up in all the other tests reported herein unless a different value is specified. The padded fabric was then dried in a forced air oven at 60°C. for 10 minutes, pressed and then cured in a forced air oven for 5 minutes at 160°C.

In Test 2, the fabric was treated employing conventional wet-fixation substantially as previously disclosed in U.S. Pat. No. 3,472,606. More particularly, in this test a resin bath was used containing 20 percent hexakis(methoxymethyl)melamine ("Aerotex P–225") as a polymer former and 20% DHDMEU, adjusted to a pH of 2 with hydrochloric acid. After drying the padded fabric to a moisture content of about 20 percent it was sealed in a Mylar polyester film envelope and wet fixed by maintaining it at 82°C. for 20 minutes in this condition. The wet fixed fabric was then scoured with a water solution containing 2% $Na_2CO_3$, dried, padded with a bath containing 0.67% $Zn(NO_3)_2 \cdot 6H_2O$ and 1.3 percent polyethylene softener and dried in an air oven at 60°C. for 10 minutes, i.e., without causing effective creaseproofing.

Finally, the treated fabric was cured for 5 minutes at 150°C. and then, as in all other cases in this example, laundered and tumble dried in conventional home laundry equipment before being evaluated.

In Test 3, the fabric was continuously padded in a resin bath of exactly the same composition and pH as in Test 2 except that in this case the padded fabric was skyed to partially dry it and then wet fixed by passage through a Rock Hill laboratory roller steamer filled with saturated steam in which it remained for a total dwell time of 60 seconds. Immediately upon emergence from the steamer it was neutralized by passage through an aqueous bath containing 2% $Na_2CO_3$, washed by passage through a water bath, dried and sensitized by padding in a bath containing 0.67% $Zn(NO_3)_2 \cdot 6H_2O$ catalyst and 1.3 percent polyethylene softener.

After padding and low temperature drying, the sensitized fabric was cured for 10 minutes at 160°C., and laundered and tumble dried before evaluation.

In Test 4, the fabric was treated exactly as in Test 3 except here the initial resin bath contained only the polymer former and enough HCl to adjust its pH to 2 while the crosslinker was applied to the fabric only after wet-fixation of the polymer former. More particularly, after wet-fixation, neutralization, washing and drying of the fabric it was repadded with a topping bath which contained 24 percent DHDMEU as well as 1.0% $Zn(NO_3)_2 \cdot 6H_2O$ catalyst and 1.3 percent polyethylene softener. After this padding and mild drying, the fabric was dry cured for 10 minutes at 160°C. and evaluated after laundering and tumble drying.

In variations of Test 4, the same procedure was followed except that only 8 percent and 16 percent respectively of DHDMEU was used in the topping bath. Very nearly the same results were obtained in each case. The results are summarized in Table I.

Table I shows that both the conventional wet-fixation technique (Test 2) as well as the novel steam wet-fixation technique (Tests 3 and 4) give cured fabrics which have a substantially better balance of properties than does the conventional pad-dry-cure technique (Test 1). The results further show that applying both the polymer former and the crosslinker in combination prior to wet-fixation tends to give somewhat better results, especially in terms of abrasion resistance, than wet fixing the polymer former first and then topping the wet fixed fabric with a crosslinker by padding, drying and finally curing.

The balance of durable press preformance and fabric strength properties has been found to be relatively independent of curing conditions in that lower cure levels result in somewhat lower durable press and wrinkle recovery values but at the same time give higher breaking strength, tear strength, and flex abrasion values.

TABLE I

COMPARISON OF DIFFERENT PROCEDURES

|  | Durable Press Rating | Wrinkle Recovery W + F,° | Br. str. retention Fill., % | Tear str. retention Fill., % | Stoll Flex Abrasion Ret. Fill., % |
|---|---|---|---|---|---|
| Acceptable Minimum | 3 | 275 | 50 | 70 | 100 |

| | | | | | |
|---|---|---|---|---|---|
| Test 1 (PDC) | 3.3 | 283 | 38 | 83 | 30 |
| Test 2 (Conv. wet fix) | 3.3 | 288 | 68 | 95 | 290 |
| Test 3 (mixed resin, Steam fix) | 3.7 | 285 | 53 | 110 | 260 |
| Test 4 (20% P-225 Steam Fix + P-183 Topping) | | | | | |
| 24 % P-183 | 3.3 | 289 | 54 | 100 | 77 |
| 16% P-183 | 3.3 | 292 | 51 | 94 | 57 |
| 8% P-183 | 3.3 | 303 | 49 | 90 | 35 |

Tests not reproduced here have shown that as dwell time in the steam chamber was reduced from 7 minutes downward, proper fixation was retained and satisfactory add-on was obtained even at less than 1 minute of steaming. The new process showed no significant change in add-on as the steaming time was reduced. In contrast, hot wet-fixation in the absence of steam, i.e., at relatively low temperatures, results in a very substantial reduction in add-on at shorter swell times, especially at times of less than 5 minutes, and can lead to premature crosslinking instead of mere wet-fixation if the fabric is permitted to dry out too much. In the presence of steam, but in the absence of prompt neutralization or quenching, the use of previously described wet-fixation techniques tends to give unsatisfactory creaseproofing unless resin add-on is high, but this in itself is undesirable because of the increased cost as well as increased stiffness and reduced strength of the treated fabric.

Other data have also shown that when the padded fabric is predried to a limited extent prior to wet-fixation the latter proceeds more quickly and a somewhat higher resin utilization is obtained in the wet-fixation step than when the freshly padded fabric is passed directly into the steam chamber for wet fixing. Free flowing saturated steam in the heating chamber can contribute to the rate of wet-fixation of the resins in that steaming or a high moisture content in the fibers apparently alters the mode of penetration of the resins in the wet-fixation step.

As indicated by the results in Table I, baths totaling 44 percent resin solids applied separately (Test 4) did not produce as acceptable a performance profile as 40 percent solids applied simultaneously (Test 3). The lower Stoll flex abrasion values obtained when the crosslinking resin was applied to non-swollen fibers over the wet fixed polymer former indicate less deep penetration of the crosslinker into the fibers than when applied with the polymer former and permitted to penetrate the swollen fibers with the polymer former upon steaming. In the former case some crosslinker apparently is concentrated on the fiber surface and contributes to lower tear strength and Stoll flex abrasion values.

EXAMPLE 2

The effect of heating the steam chamber to temperatures well above that for saturated steam at 100°C. was determined by a series of 1-minute steaming trials conducted in a high temperature pressure steamer (FMC Laboratory Pressure-Lock steamer) using the same acidified resin bath as in Tests 2 and 3 of Example 1 at a wet pick-up of 70 percent. Substantially saturated steam at the desired temperature was obtained by keeping the steam generating boiler as well as the steam chamber under the appropriate pressure. After wet-fixation in the steam chamber at the indicated temperature for a 1-minute dwell time, the fabrics were again promptly neutralized with 2 percent sodium carbonate solution, washed to remove water soluble matter and loose polymer, dried, impregnated with a catalyst solution containing 0.67 percent zinc nitrate and 1.3 percent polyethylene softener, dried and cured for 5 minutes at 160°C. The results are shown in Table II.

TABLE II

EFFECT OF STEAMING AT VARIOUS TEMPERATURES

| Properties | Chamber Temperature, °C. | | |
|---|---|---|---|
| | 120 | 136 | 140 |
| Durable Press Rating* | 3.4 | 3.4 | 3.3 |
| Tearing Strength filling (% ret.) | 126 | 122 | 100 |
| Grab Breaking Strength filling (% ret.) | 53 | 57 | 51 |
| Stoll Flex Abrasion filling (% ret.) | 384 | 370 | 259 |

*After one laundering and tumble drying cycle.

The results show that at temperatures above 100°C. the steaming temperature has only a small effect on the properties of the resulting fabrics although fabrics leaving the steamer at high pressure tended to dry somewhat before they could be quenched in the neutralization bath.

EXAMPLE 3

A series of tests was carried out using various combinations of polymer formers and crosslinking resins at different bath concentrations. Each application was run with as well as without infrared partial drying between pad and steamer, and the results are shown in Table III. As the table shows, limited predrying of the padded cloth (e.g., to a moisture content of about 30 percent) did increase add-on in all but one instance. The only exception was a run with 5 percent "Aerotex 19" hexakis(methoxymethyl)melamine and 10 percent "Fixapret PCL" modified methylolated propylene urea compound. The data point to a dependence of crosslinker penetration on adequate concentration and wet-fixation of the melamine polymer former. Unless ample polymer former is present to keep the fibers propped open, no additional crosslinker is added on even if its concentration in the bath is relatively high.

Table III also shows that the efficiency of resin fixation varied considerably from about 40 percent for the 10/10 Aerotex 19/Fixapret PCL bath (without predrying) to about 90 percent for the 5/5 Aerotex 23/Fixapret PCL system (with predrying). However, in all instances the efficiency of resin utilization was far above the 25 percent which is characteristic of the efficiency achieved in conventional wet-fixation such as that represented by Test 2 in Example 1.

TABLE III

EFFECT OF PARTIAL DRYING ON WET FIXATION BY STEAMING

| Resin Bath | Weight Add-on % After Wet Fixation | |
|---|---|---|
| | No Heating (Resin Efficiency %) | Infrared Heating (Resin Efficiency %) |
| 5/5 A.23[1]/Fix. PCL [3] | 6.2 (82) | 6.6 (88) |
| 7/7 A.19[2]/Fix. PCL | 6.5 (62) | 7.2 (87.5) |
| 5/10 A.19/Fix. PCL | 7.3 (65) | 7.3 (65) |
| 10/5 A.19/Fix. PCL | 7.8 (69.5) | 8.1 (72.5) |
| 10/10 A.19/Fix. PCL | 6.0 (40) | 7.7 (51) |
| 10/10 A.23/P-183[4] | 7.4 (49.5) | 8.5 (57) |
| 10/10 A.23/Fix. PCL | 7.5 (50) | 8.6 (57.5) |
| 10/10 M 3[5]/P-183 | 8.6 (57.5) | 9.2 (61.5) |
| 10/10 M 3/Fix. PCL | 7.7 (51.5) | 8.3 (55.3) |
| Average | 7.2 | 7.9 |

(1) "A.23" = Aerotex 23
(2) "A.19" = Aerotex 19
(3) "Fix.PCL" = Fixapret PCL
(4) "P-183" = Permafresh 183
(5) "M 3" = Aerotex M 3

The results in Table III also are interesting in showing that a resin bath containing as little as 5 percent polymer former and 5 percent crosslinking resin is capable of yielding a resin add-on of 6 percent or more after wet-fixation in accordance with the present invention, sufficient for producing a satisfactory durable press fabric after final cure; and doubling the resin content of the padding bath results in only about a 30 percent increase in resin add-on after wet-fixation. Optimum results in terms of resin efficiency and final performance rating are obtained with systems such as those illustrated in Table III from resin baths containing 7 to 10 percent polymer former and 5 to 10 percent crosslinker. Baths containing 7 percent polymer former and 7 percent crosslinker are particularly preferred. Virtually equivalent individual fabric properties and performance profiles are obtained when a resin bath containing 7 percent polymer former and 7 percent crosslinker is used as when a bath containing 20 percent polymer former and 20 percent crosslinker is used. The fact that the present invention permits the use of much more dilute resin baths naturally represents an important economic advantage.

To obtain more accurate insight into the operation of the steam fixation step, yarns from a number of the steam treated fabrics (the properties of which were summarized above in Table III) were taken after laundering and dyed with Acid Red to stain the N-methylol components. The resin content of these fabrics was determined by customary weight determination of add-on as well as by nitrogen analysis for melamine and crosslinker. Although it was clear that the two techniques gave proportional results the weighing method tended to overestimate the resin fixed, at least for samples having an add-on of less than 8 percent. Nitrogen analysis is believed to assess the effective resin content inside the fiber more accurately than the weighing method, probably because surface polymer is removed in scouring the samples for the chemical analysis.

Cross-sections of these dyed yarns when investigated under a microscope revealed a noticeable difference in the amount of resin in the fibers. At about 8.5 to 9.5 percent wet-fixed resin add-on (equal to about 8 to 9 percent resin content by nitrogen analysis), very full resin penetration was observed; at about 8 percent add-on (about 6.5 percent resin content by nitrogen analysis), the resin penetration was moderate; and at between about 6.5 and 7.5 percent add-on (about 2.5 to 3.2 percent resin content by nitrogen analysis), the resin penetration was light. All yarns had very even penetration of resin throughout every fiber.

These analyses suggest that wet-fixation conducted in accordance with this invention is so highly effective at such short dwell times because the fibers swell quickly upon exposure to heat and maintenance of a high moisture content, the resins penetrate the fibers immediately, and the whole process is stopped before migration outward and other undesirable phenomena such as hydrolysis can occur. Less total resin is therefore needed in the pad bath in such a case to achieve equivalent performance in the fabric and good performance can be obtained even when resin penetration throughout the fiber is light, e.g., if resin content (by nitrogen analysis) is 5 percent. Optimum performance rating was obtained with yarns having moderate resin penetration (6 to 7 percent resin content).

The work also suggests that because penetration of resin is so even and pervasive when wet-fixation is conducted in accordance with the present invention, it is highly effective in protecting the cellulosic fiber from chemical degradation during the subsequent, final cure and achieves sufficient crosslinking to develop full durable press properties even at low resin add-ons.

Penetration of resin into the fibers is most rapid if the fabric tension in the steamer is kept low, i.e., if unnecessarily high tensions are avoided. Increasing tension counteracts the swelling effect of steam or hot water on the cellulosic fibers and impedes imbibition of the treating solution.

EXAMPLE 4

The effect of various steaming times is illustrated by the series of runs shown in this example. The resin bath used in this series contained 10 percent Aerotex 19 and 10 percent Fixapret PCL and was applied to twill fabric No. 413 at a wet pick-up of 75 percent. After passing the padded cloth continuously through saturated steam in the steamer at rates giving swell times from between 30 to 180 seconds as specified in Table IV, the fabrics were again promptly quenched by being neutralized in 2 percent sodium carbonate solution. They were then washed, dried under mild conditions so as to avoid effective creaseproofing, padded in a catalyst bath containing 0.67 percent zinc nitrate and 1.3 percent polyethylene softener and after further drying cured for 10 minutes at 160°C.

TABLE IV

EFFECT OF STEAMING TIME ON WET FIXATION

Bath: 10/10 A.19/Fix PCL  Wet Pickup: 75%
Catalyst: ½% Zinc Nitrate  Softener: 1% "Velvamine 732" Polyethylene Dispersion
Cure Time: 10 Min.  Cure Temp.: 160°C.

| Properties | Dwell Time | | |
|---|---|---|---|
| | 30 sec. | 60 sec. | 180 sec. |
| Wrinkle Recovery (deg.) after 1 L + TD, W + F | 283 | 278 | 265 |

| | | | |
|---|---|---|---|
| Tearing Strength filling (% ret.) | 82 | 91 | 87 |
| Stoll Flex Abrasion filling (% ret.) | 106 | 217 | 268 |

The tabulated data clearly show that even as steaming time is increased from 30 seconds to 180 seconds a noticeable loss in wrinkle recovery results while the Stoll abrasion figures increase. This shows that 30 seconds steaming is capable of giving the best fixation of crosslinking resin in a typical case employing a melamine resin as the polymer former.

When similar runs (not reproduced here) were conducted wherein the fabrics were not quenched and neutralized immediately as they left the steam chamber but were held and neutralized only after a lapse of 30 minutes, such a procedure resulted in resin coated fibers of low tear strength and Stoll flex life. In other words, the desired level of fixation and evenness of resin distribution can be obtained from a dilute bath only when the hot, acid-containing fabric is wet fixed in steam or a high humidity state for a carefully limited time and quenched and neutralized immediately as it leaves the heating chamber.

EXAMPLES WITHOUT ADDED STEAM

The practice of the present rapid wet-fixation process in the absence of added steam is illustrated in the following examples.

The heat treating unit used in this series of runs was assembled from two opposing pairs of oven sections (Chromalox, Catalog No. LW21) placed on top of each other in a mutual frame having a solid metal bottom. Each of the four oven sections was 22 inches long, 4 inches wide and 12 inches high (inside dimensions) and had a concave gold-dyed, anodized aluminum reflector. The assembled unit, containing a heating space measuring approximately 22 × 8 × 24 inches was equipped with a hinged lid. One quartz tube element, ⅜ inch diameter, 17 inches long, rated at 34 watts per linear inch, with a maximum operation temperature of 870°C. (Chromalox, part number 4-47624) was fitted horizontally into the center of each section. The distance between opposite tubes was 8¼ inches, with the fabric sample located at the midpoint on a removable pin frame. The unit was operated from a 240 volt source.

Standard NCC cotton twill was used in all runs. Each sample measured 20 × 20 inches for processing and later was pinked to 15 × 15 inches for appearance evaluation.

The two commercial resins used were:

Aerotex 19, substantially all hexamethoxymethylmelamine, manufactured by American Cyanamid Company.

Permafresh 183, dimethylol dihydroxyethyleneurea, manufactured by Sun Chemical Corporation.

Other chemicals used in the resin and catalyst baths were:

Concentrated HCl.
Triton X-100, wetting agent.
$Zn(NO_3)_2 \cdot 6H_2O$, catalyst.
Catalyst X-4, $Zn(NO_3)_2$-based product, manufactured by Sun Chemical Corporation.
Velvamine 732, polyethylene softener, manufactured by Refined Onyx Chemical Company.

EXAMPLE 5

In this series, pad baths were made up to contain from 5 percent to 20 percent each of Aerotex 19 and Permafresh 183 or, in a few treatments, Aerotex 19 or Permafresh 183 singly at 10 percent. After combining the resins and a portion of the dilution water, the mixture was acidified to pH 2 with hydrochloric acid. Finally, the remaining dilution water and the wetting agent were added to the bath, and the pH was rechecked.

A fabric sample was saturated with the bath and squeezed in the laboratory padded to 70 percent wet pick-up. The wet sample was then mounted smoothly on a pin frame and placed in the infrared unit preheated to 205°C. The air temperature was measured using a thermocouple and meter with the thermocouple located at about the center of the unit. With the door closed during each run, the temperature fell gradually to 170°, 162° or 150°C. for dwells of 10, 20 and 30 seconds. The sample was then removed from the frame, air-cooled for 5 minutes neutralized in 2 percent sodium carbonate solution, and rinsed in tap water. As a process wash, samples were given a 60°C. laundering (AATCC Test Method 124-1969 IIIB). Add-on percentages were calculated using the conditioned weight of the laundered samples.

For catalyzation, the "wet-fixed only" samples were padded through a bath containing sufficient material to deposit ½% $Zn(NO_3)_2 \cdot 6H_2O$ and 1 percent polyethylene solids on the weight of the fabric, dried at 52°C., pressed on the hot-head press with one or two automatic cycles (2 seconds steam, 8 seconds bake with vacuum) and cured in a forced-draft oven at 160°C. for 10 minutes.

In comparative runs wherein conventional envelope wet-fixation was used, bath preparation and padding procedures were the same as described above. However, following padding, a sample was sealed as smoothly as possible in a Mylar polyester film envelope and placed in a forced-draft oven at 82°C. for 15 minutes. After removal from the envelope, the sample was cooled, neutralized, laundered, and weighed for add-on. To complete processing, the sample was catalyzed, pressed, and cured.

In the runs wherein the conventional pad-dry-cure technique was used, this was done by padding to 70 percent wet pick-up drying at 52°C., pressing and curing for 10 minutes at 160°C. The samples were weighed after drying and before pressing to make add-on results comparable with those for the wet-fix samples. The commercial controls were produced from pad paths containing 8.5 percent Permafresh 183 solids (6% owf) and the normal amounts of catalyst and softener.

The treated samples were evaluated as follows. After one or five laundry cycles (AATCC Test Method 124-1969 IIIB) the samples were conditioned at 21°C. and 65 percent relative humidity and evaluated for textile properties according to the standard AATCC or ASTM test methods for smoothness and crease appearance after laundering, wrinkle recovery angle, and filling mechanical properties of breaking strength, Elmendorf tearing strength, and Stoll flex abrasion under 1 × 4 pounds head and tension loads.

In illustrating the idea of infrared wet-fixation, the first objectives were to show to what extent and in what form polymer would deposit and to correlate moisture loss with the appearance and hand of the wet-fixed samples, readily observable and accurate indicators of excessive surface polymer. A series of samples was padded to different wet pick-ups, exposed for short times in the infrared heating oven, and carried through process washing, with the results recorded in Table V. To exaggerate effects, a high concentration of resin, 40 percent total solids, was employed.

These tests demonstrate that the basic requirement of wet-fixation treatment, which is polymer deposition, is achieved by infrared treating. Useful levels of polymer were deposited in as little as 10 seconds, making this method even faster than steaming. And, of course, even shorter times may work under suitable circumstances.

The results in Table V also show that, while concern for the deleterious effects of moisture loss was quite justified, the problems can be avoided by appropriate choice of wet pick-up and exposure time, even when the amount of resin padded onto a fabric is at an extremely high level. Moisture loss had less effect at 70 and 80 percent wet pick-up than at 55 percent in terms of a heavy, surface resin deposit which conferred a coated look and stiff hand. However, at all the pick-up levels, a 40 second dwell or longer caused excessive drying and produced stiff samples in the particular equipment used.

TABLE V

EFFECT OF WET PICKUP AND DWELL TIME ON MOISTURE LOSS ADD-ON, AND CONDITION OF WET-FIXED ONLY TWILL*

| Sample No. | Wet Pickup | Dwell Time | Moisture Loss | Add-on | Appearance/ Hand |
|---|---|---|---|---|---|
| | % | sec. | % | % | |
| 51 | 55 | 10 | 7 | 10.2 | Acceptable |
| 52 | 55 | 20 | 20 | — | Coated/Stiff |
| 53 | 55 | 40 | 30 | — | Coated/Stiff |
| 54 | 70 | 10 | 15 | 10.3 | Acceptable |
| 55 | 70 | 20 | 26 | 10.9 | Acceptable |
| 56 | 70 | 40 | 37 | — | Coated/Stiff |
| 57 | 80 | 10 | 20 | 8.5 | Acceptable |
| 58 | 80 | 20 | 26 | 13.5 | Acceptable |
| 59 | 80 | 40 | 38 | — | Coated/Stiff |
| 60 | 80 | 60 | 46 | — | Coated/Stiff |

* Samples were padded, exposed in the infrared treating unit, neutralized, machine washed and tumble dried.

wet-fixation, the polymer-containing samples with acceptable aesthetics were catalyzed, dried, cured, and evaluated. The results in Table VI show that infrared-deposited polymer can react satisfactorily with cotton. Satisfactory durable press properties, measured in terms of smooth drying and good wrinkle recovery characteristics, were obtained on heat curing. Better durable press properties than those shown may be obtained if one operates at a higher level of crosslinking, as revealed by the wrinkle recovery results.

EXAMPLE 6

The effects of resin concentration and dwell time are shown in the next series of runs, using the fabric, chemicals and equipment as were used in Example 5. In this series samples were prepared from pad baths containing 20, 30, and 40 percent total solids of equal weight mixtures of Aerotex 19 and Permafresh 183, while holding wet pick-up at 70 percent. Samples with a given resin level were exposed for times up to 30 seconds and then processed through pressing, curing, and evaluation. As shown in Table VII, the relationship between add-on resulting from wet-fixation (no catalyst and softener) and resin concentration in the bath is weak, suggesting that there may be a limit to the amount of resin which will fix in up to 30 seconds by this method. The correlation between add-on and dwell time is somewhat stronger, but the incremental increase of polymer for a 10 second increase beyond the first 10 seconds of exposure is small. This is further indication that dwells of less than 10 seconds may be sufficient.

TABLE VI

[Properties of cured twill samples produced with 20% aerotex 19/20% permafresh 183 mixture wet-fixed by infrared heating]

| | | | Properties after 1 (L+TD) | | | |
|---|---|---|---|---|---|---|
| Sample number | Wet pickup, percent | Dwell time, sec. | Durable press | WRA (W+F) deg. | Filling brk. str. ret., percent | Filling tear str. ret., percent |
| 51 | 55 | 10 | 3.0 | 250 | 56 | 69 |
| 54 | 70 | 10 | 3.0 | 260 | 59 | 78 |
| 55 | 70 | 20 | 3.3 | 287 | 65 | 68 |
| 57 | 80 | 10 | 3.0 | 264 | 68 | 83 |
| 58 | 80 | 20 | 3.0 | 265 | 74 | 77 |

TABLE VII

[Effect of high resin levels and dwell times on twill properties]

| | | | | | | Properties after 1 (L+TD) | | |
|---|---|---|---|---|---|---|---|---|
| Sample number | Conc. of bath, percent/percent | Dwell time, sec. | Add-on, percent | Durable press | Crease retention | WRA (W+F) deg. | Filling brk. str. ret., percent | Filling tear str. ret., percent | Filling stoll flex ret., percent |
| 70 | 20 A19/20 P183 | 10 | 10.9 | 3.0 | 3.8 | 276 | 54 | 68 | 51 |
| 71 | 20 A19/20 P183 | 20 | 12.0 | 3.3 | 4.2 | 294 | 49 | 55 | 61 |
| 72 | 20 A19/20 P183 | 30 | 14.9 | 2.2 | 4.2 | 282 | 56 | 45 | 77 |
| 73 | 15 A19/15 P183 | 10 | 9.1 | 3.3 | 4.0 | 282 | 52 | 67 | 74 |
| 74 | 15 A19/15 P183 | 20 | 9.7 | 3.4 | 3.5 | 294 | 48 | 58 | 60 |
| 75 | 15 A19/15 P183 | 30 | 10.7 | 3.3 | 3.8 | 295 | 61 | 58 | 59 |
| 76 | 10 A19/10 P183 | 10 | 9.8 | 3.3 | 3.6 | 290 | 55 | 65 | 55 |
| 77 | 10 A19/10 P183 | 20 | 10.5 | 3.3 | 3.8 | 289 | 70 | 69 | 66 |
| 78 | 10 A19/10 P183 | 30 | 11.6 | 3.2 | 4.0 | 293 | 70 | 73 | 69 |

To demonstrate whether the deposited polymer could crosslink cotton, another key requirement of The closeness of the add-ons of the various samples may explain the lack of definite correlations between the processing conditions and durable press performance.

With regard to mechanical properties of the samples, there is a trend toward somewhat better retention of initial strength and abrasion as resin concentration goes down. This is advantageous because durable press performance remains the same. Better combinations of retained breaking strength, tearing strength, and flex abrasion were obtained from the samples padded with the 10/10 mixture and exposed 20 to 30 seconds.

A further series of samples was produced using pad baths of even lower concentrations. Otherwise, processing was the same.

The properties of the various samples produced from these resin mixtures are summarized at the upper part of Table VIII. As in the previous series, add-on improves slightly with increasing exposure from 10 to 30 seconds, and pad-bath concentration appears to have little effect. The finding that add-on is relatively constant over the range of pad bath concentrations studied (compare second and fourth columns) indicates that at these low concentrations the efficiency of fixing resin by infrared is very high.

The durable press ratings of the current series are quite high and appear to represent a further improvement over the previous series. However, there is a slight decline in smoothness and an accompanying, larger decline in wrinkle recovery angle as resin concentration decreases. A 10/10 mixture appears to be optimum in terms of these performance factors.

As a part of this work, the polymer-forming resin, Aerotex 19, and the crosslinking resin, Permafresh 183, were applied separately at 10 percent bath concentration and infrared-wet-fixed, with the results given at the bottom of Table VIII (Samples Nos. 810–815).

Aerotex 19 deposits more efficiently alone than when combined with the crosslinking resin. The average Aerotex 19 add-on of 10.7 percent is similar to add-ons obtained when mixtures are used. Overall, the properties of the Aerotex 19 samples are consistent with those produced from resin mixtures. However, in terms only of durable press performance factors, 10 percent Aerotex 19 is not equalled until the mixture concentration reaches 10/10.

Permafresh 183 wet-fixed by itself is not as effective as mixtures or Aerotex 19 alone. Durable press ratings did not exceed 2.8, while wrinkle recovery angles did not exceed 260°.

PERFORMANCE-STRENGTH BALANCE

The FIGURE compares graphically the properties of twill wet-fixed by the envelope, steam, and infrared methods with those of twill treated by the conventional pad-dry-cure method. (The steamed twill was produced in a different study.) These particular samples were chosen because of their similarity in overall durable press performance. The steam and infrared samples were produced from 10/10 mixtures of polymer builder and cross-linking resin (Fixapret PCL in the case of the steamed sample), but in order to attain a comparable performance level in an envelope-wet-fixed sample, it was necessary to use a 20/20 resin mixture. The 10/10 envelope-wet-fixed sample was considerably poorer in performance showing a durable press rating of 2.5 and a crease rating of 3.2. Thus, this comparison points out the chemical cost advantage of infrared and steaming as well as illustrating the balance of properties provided by the various wet-fixation methods.

It can be seen in the FIGURE that the three methods afford about the same level of retained mechanical properties for the level of performance shown, and, therefore, at this level the balance of properties of the wet-fixation methods is similar. The Figure also shows the advantage of the wet-fixation methods over the conventional pad-dry-cure method.

In view of the foregoing description of the nature of the invention and of the manner in which it may be practiced and used, the subject matter for which exclusive rights are solicited is particularly pointed out and claimed in the appended claims.

We claim:

1. A rapid wet-fixation process characterized by improved resin fixation efficiency in the production of cellulosic fiber-containing material suitable for the fabrication of durable press apparel therefrom, which comprises:

continuously applying an aqueous liquid adjusted to an acid pH of between about 1 and 4 and containing between about 5 and 25 percent of a water soluble, hardenable polymer former possessing reactive N-methylol groups to said material in an amount sufficient to deposit thereon at least about 3 percent of said polymer former based on dry weight of said material, heating said acid- and polymer former-containing material while maintaining its moisture content at

TABLE VIII

[Effect of low resin levels and dwell times on twill properties]

| Sample number | Conc. of bath, percent/percent | Dwell time, sec. | Add-on, percent | Durable press | Crease retention | WRA (W+F) deg. | Filling brk. str. ret., percent | Filling tear str. ret., percent | Filling stoll flex ret., percent |
|---|---|---|---|---|---|---|---|---|---|
| 81 | 10 A19/10 P183 | 10 | 9.7 | 3.8 | 3.9 | 276 | 56 | 67 | 64 |
| 82 | 10 A19/10 P183 | 20 | 9.9 | 3.7 | 3.5 | 280 | 53 | 65 | 61 |
| 83 | 10 A19/19 P183 | 30 | 10.3 | 3.8 | 3.5 | 283 | 52 | 63 | 59 |
| 84 | 7.5 A19/7.5 P183 | 10 | 9.6 | 3.5 | 3.2 | 262 | 55 | 72 | 58 |
| 85 | 7.5 A19/7.5 P183 | 20 | 9.4 | 3.6 | 3.3 | 276 | 56 | 71 | 55 |
| 86 | 7.5 A19/7.5 P183 | 30 | 10.2 | 3.5 | 3.4 | 277 | 59 | 70 | 67 |
| 87 | 5 A19/5 P183 | 10 | 10.6 | 3.6 | 3.4 | 268 | 60 | 67 | 75 |
| 88 | 5 A19/5 P183 | 20 | 9.6 | 3.4 | 3.2 | 263 | 57 | 76 | 65 |
| 89 | 5 A19/5 P183 | 30 | 9.3 | 3.5 | 3.2 | 261 | 60 | 67 | 85 |
| 810 | 10 A19 | 10 | 9.0 | 3.8 | 3.3 | 270 | 47 | 68 | 58 |
| 811 | 10 A19 | 20 | 11.4 | 3.8 | 3.8 | 284 | 56 | 65 | 45 |
| 812 | 10 A19 | 30 | 11.7 | 3.8 | 3.8 | 288 | 60 | 65 | 57 |
| 813 | 10 P183 | 10 | 9.4 | 2.8 | 2.4 | 231 | 55 | 78 | 78 |
| 814 | 10 P183 | 20 | 9.7 | 2.8 | 2.9 | 259 | 64 | 73 | 83 |
| 815 | 10 P183 | 30 | 9.1 | 2.6 | 3.2 | 260 | 53 | 66 | 61 | not less than 20 percent while continuously passing said material through a heating zone which is heated to a temperature between about 100° and 140°C., the dwell time of the material in said heating zone being limited to from about 10 to 90 seconds and sufficient to fix said polymer former in said material while avoiding any effective cross-linking or creaseproofing thereof, and continuously cold quenching and dissipating acidity from the resulting wet fixed material under non-polymerizing conditions immediately upon completion of said heating while avoiding effective cross-linking or creaseproofing of said material, thereby substantially preventing further reaction and migration of the polymer former.

2. A process according to claim 1 wherein the heating zone has an atmosphere substantially saturated with steam.

3. A process according to claim 1 wherein extraneous steam is introduced into the heating zone in the heating step.

4. A process according to claim 1 wherein the heating zone is heated to a temperature between about 150° and 220°C. by infrared heating elements and wherein escape of moisture from the heating zone is suppressed so as to keep the moisture content of the material above 20 percent.

5. A process according to claim 1 wherein the said acid- and polymer former-containing material is heated in the said heating zone by being passed at a high speed over a set of steam-heated, rotating dry cans having a surface temperature of from about 100° to 160°C.

6. A process for imparting shape retention properties to cellulosic fiber-containing material which comprises:

continuously applying a liquid solution adjusted to an acid pH of between about 1 and 4 and containing a water soluble, hardenable polymer former to said material in an amount sufficient to deposit thereon at least about 3 percent of said polymer former based on dry weight of said material, continuously passing said material with applied acid solution through a heating zone which is maintained at a temperature of at least about 100°C. while maintaining the moisture content of the material therein at not less than 20 percent, the dwell time of the material in the heating zone being limited to from about 10 seconds to about 90 seconds, thereby wet-fixing on said material between about 3 percent and 10 percent insoluble resin and-on (dry basis) while avoiding any effective cross-linking or creaseproofing of said material, continuously raising the pH of the material to at least about 6 promptly after its emergence from the aforesaid wet-fixation zone and washing the wet-fixed material to remove water soluble substances therefrom while avoiding effective cross-linking or creaseproofing of said material, thereby substantially preventing further reaction and migration of the polymer former, continuously applying to said material a cellulose crosslinking agent other than said polymer former either simultaneously with the latter or after wet-fixation of the latter, said crosslinking agent being applied in an amount sufficient to make the material shape retentive upon curing, and further continuously applying to the material an acid acting curing catalyst so that the resulting material may be ultimately dry cured and durable press properties may thus be imparted thereto.

7. A process according to claim 6 wherein said material contains at least 15 percent cotton fiber.

8. A process according to claim 6 wherein said curing catalyst is an acid acting salt selected from the group consisting of zinc chloride, zinc nitrate, magnesium chloride and ammonium chloride.

9. A process according to claim 6 wherein the duration of the wet-fixation step preceding the neutralization step is limited to between about 10 and 40 seconds and is kept substantially to the minimum necessary to insolubilize the polymer former on the material.

10. A process according to claim 6 wherein the material having the polymer former and crosslinking agent applied thereto is shaped into a garment after the wet-fixation step and prior to being dry cured.

11. A process according to claim 6 wherein the said acid- and polymer former-containing material is heated in the said heating zone by being continuously passed at a high speed over a set of steam-heated, rotating dry cans having a surface temperature of from about 100° to 160°C.

12. A process according to claim 6 wherein said wet-fixation step is carried out in a steamer at a temperature between about 105° and about 140°C. for a dwell time of between about 10 and 90 seconds.

13. A process according to claim 12 wherein the material padded with said aqueous liquid is dried to a water content between about 20 and 40 percent prior to being steamed in the wet-fixation step.

14. A process according to claim 12 wherein said polymer former is a melamine-formaldehyde precondensate and is applied from an aqueous solution at a pH between about 1 and 3 in which it is contained at a concentration of from between about 5 and 25 weight percent.

15. A process according to claim 14 wherein the polymer former and the crosslinker are applied to the material simultaneously from a single solution wherein each is contained in a concentration between about 5 and 10 percent.

16. A process according to claim 15 wherein the cross-linker is a member of the class consisting of formaldehyde, glyoxal, glutaraldehyde, hydroxy N-methylol ethylene ureas, N-methylol cyclic ethylene ureas, N-methylol propylene ureas, triazones, N-methylol carbamates, and mixtures thereof.

17. A wet-fixation process characterized by improved resin fixation efficiency in the production of cotton-containing textile material suitable for the fabrication of durable press apparel therefrom, which process comprises:

continuously applying an aqueous liquid adjusted to an acid pH of between about 1 and 4 and containing between about 5 and 25 percent of a water soluble, hardenable polymer former possessing reactive N-methylol groups to said material in an amount sufficient to deposit thereon at least about 3 percent of said polymer former based on dry weight of said material, continuously passing said acid- and polymer former-containing material through a steaming zone containing a substantially saturated steam atmosphere at a temperature between about 100° and 140°C. at a rate corresponding to a dwell time in said zone former is wet-fixed on said material in the form of a water insoluble resin at a dry add-on of between about 5 and 10 percent but without effectively cross-linking or creaseproofing said material, and continuously neutralizing the acid-containing material with an aqueous solution of alkali promptly after completion of the aforesaid wet-fixation step while avoiding any effective cross-linking or creaseproofing of said material, thereby substantially preventing further reaction and migration of the polymer former.

18. A process according to claim 17 wherein said at a temperature between about 100° and 140°C. at a rate corresponding to a dwell time in said zone of about 10 to 90 seconds and until said polymer aqueous liquid applied to said material is at a pH between about 2 and 3 and contains both a polymer former and a crosslinker, each in a concentration from between about 5 to about 10 percent, and wherein said material after being neutralized with alkali is washed to remove water soluble matter therefrom, dried, impregnated with an aqueous solution of a latent curing catalyst, dried again at a temperature below about 90°C., and ultimately dry cured after manufacture of a garment therefrom, thereby imparting durable press properties thereto.

* * * * *

Disclaimer 3,709,657.—*Norman R. S. Hollies*, Bethesda, and *Steven R. Chafitz*, Rockville, Md. WET FIXATION OF RESINS IN FIBER SYSTEMS FOR DURABLE PRESS. Patent dated Jan. 9, 1973. Disclaimer filed June 22, 1972, by the assignee, *Cotton, Incorporated*.

Hereby disclaims the portion of the term of the patent subsequent to Oct. 14, 1986.

[*Official Gazette May 29, 1973.*]